United States Patent Office 3,331,727
Patented July 18, 1967

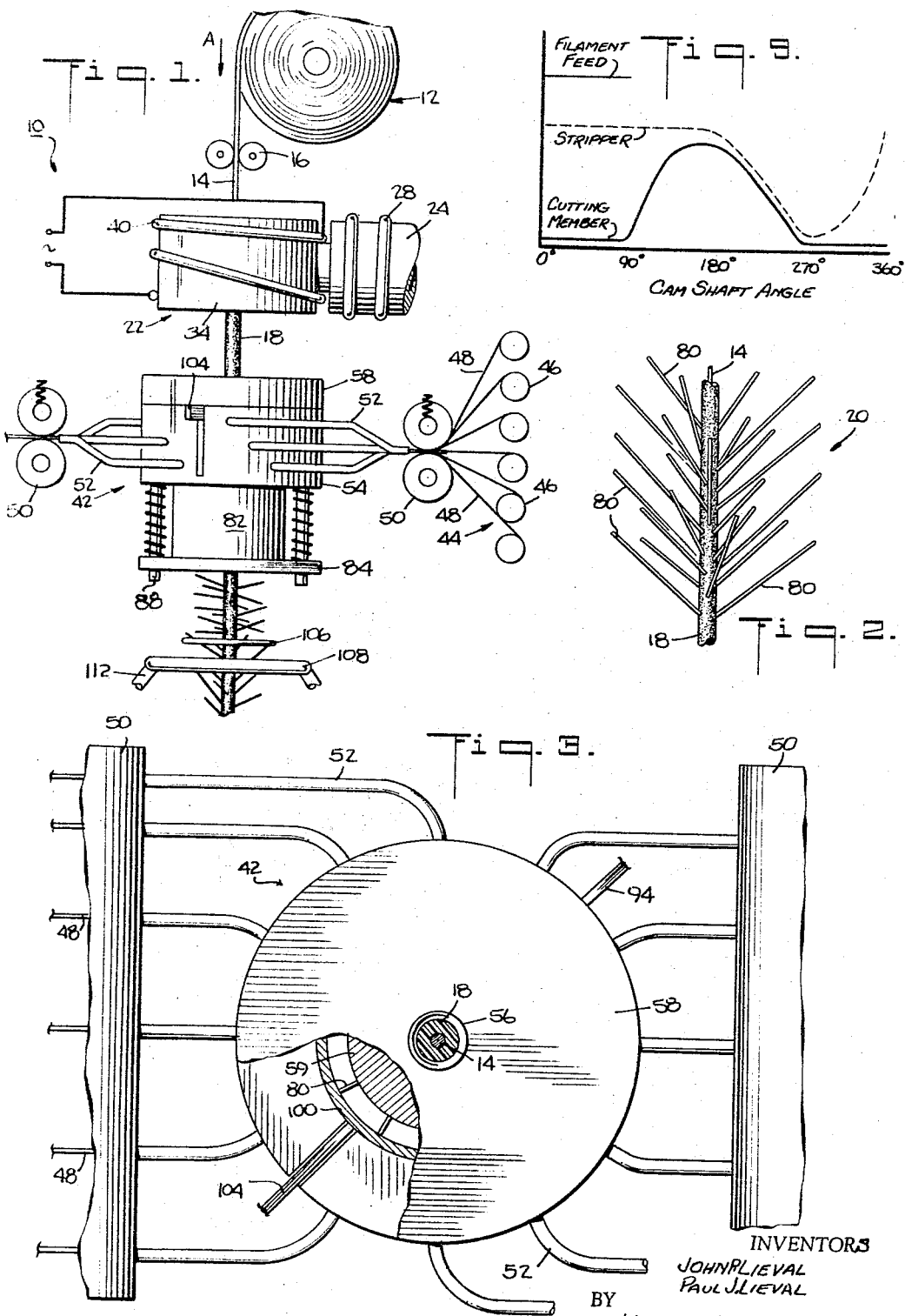

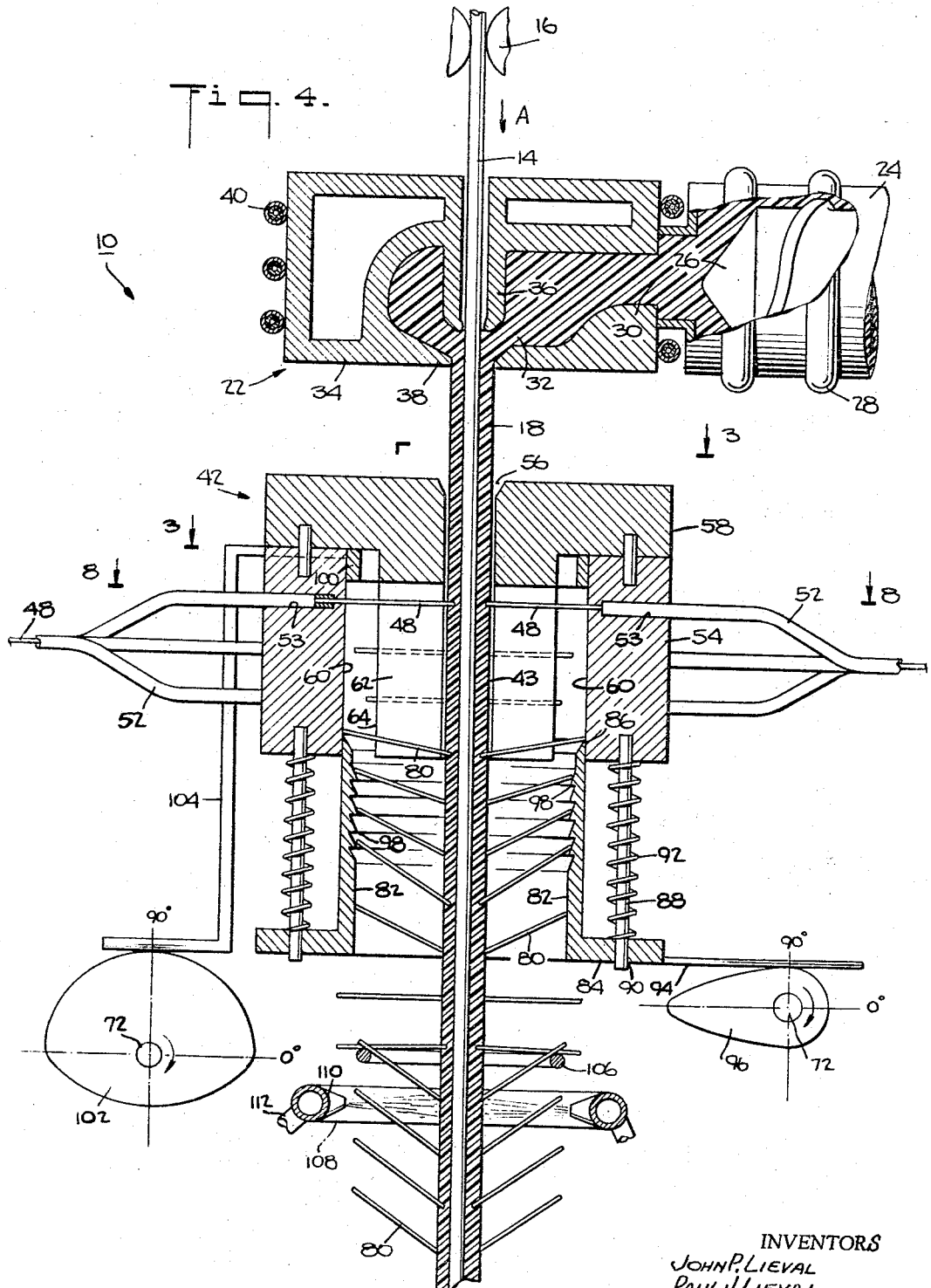

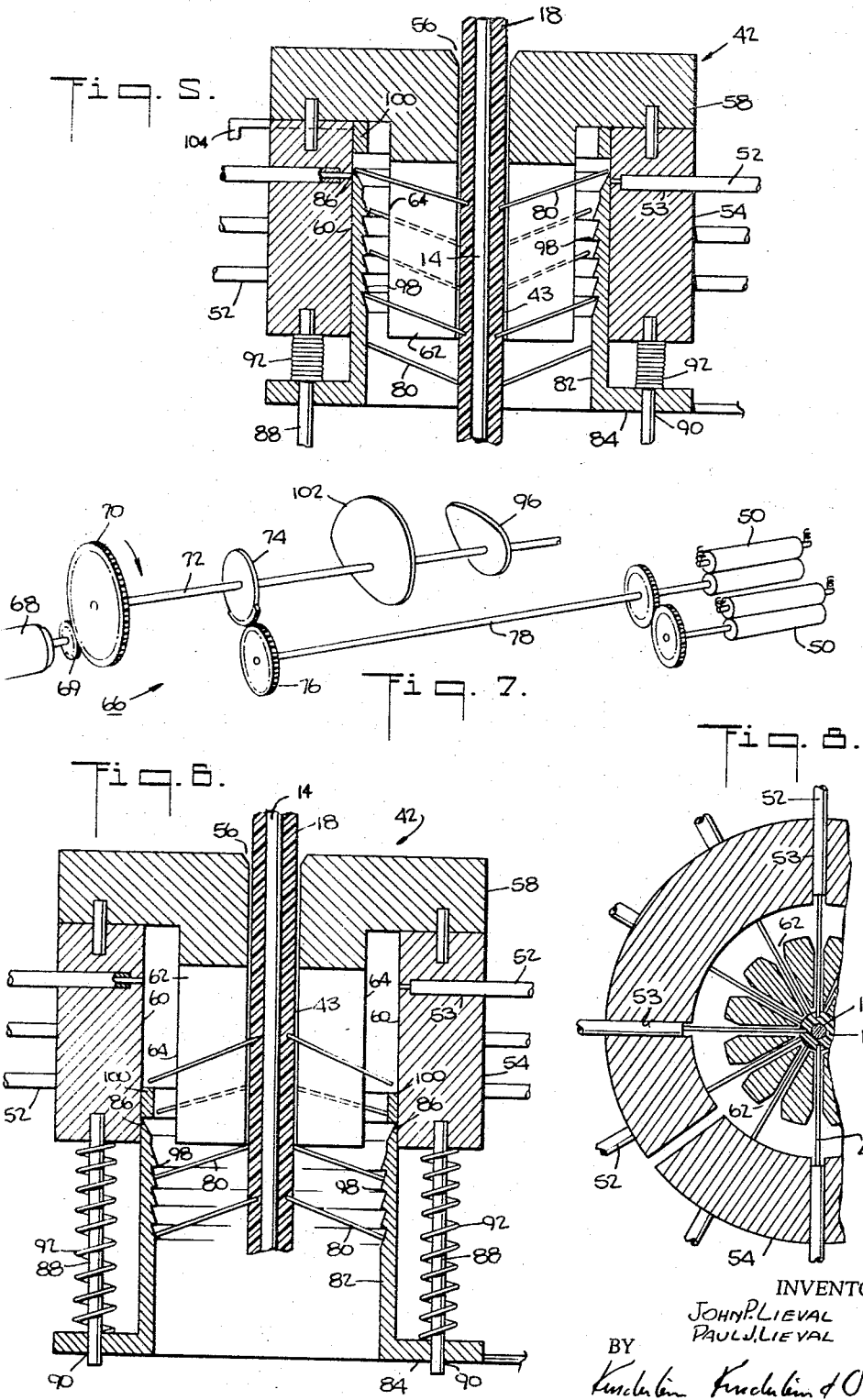

3,331,727
ARTIFICIAL TREE BRANCH
John P. Lieval and Paul J. Lieval, both of Oak Tree Road,
Palisades, N.Y. 10964
Filed Feb. 15, 1963, Ser. No. 258,852
1 Claim. (Cl. 161—22)

This invention relates to artificial tree branches of the needled evergreen variety.

It is an object of this invention to provide an artificial tree branch closely imitating the appearance of a natural tree branch of the needled evergreen variety, being a branch that primarily is composed of a central stem and numerous flexible needles emanating radially from the stem so as to present a full, i.e. bushy, appearance.

It is a further object of this invention to provide an artificial branch of the character described which can be inexpensively mass produced by high speed, low cost forming methods using plastic materials having the characteristics of strength, permanence, colorability, ease of forming and pleasing appearance.

It is a further object of this invention to provide an artificial branch of the character described which is suitable for decorative purposes in making artificial trees, and artificial flowers and plants, and in other areas where artificial ornamentation may be advantageously employed.

The artificial plant and flower industry has in recent years made great strides in the production of artificial decorations which closely imitate their natural counterparts. So well has plastic been styled, colored, formed and molded into flowers, leaves, fruit and vegetables that from a distance one can no longer be certain if he is viewing the natural or the synthetic embodiment.

There are some aspects, however, where the art has been lacking, and it is the disadvantages attendant thereupon which are overcome by the present invention. The first of these concerns the cost of extensive hand labor. The various components of present day imitation flowers and plants are quickly and easily formed by known plastic forming methods; however, when these parts are assembled to form the finished product it is common to use hand labor. This is necessary since the methods utilized for joining one part to another, for example a leaf to a stem, are not readily adaptable for mass production. Wire wrapping, tape wrapping, the use of adhesive, the use of a plastic button and plastic button receptacle, mechanical expedients for jointly gripping two parts—all these methods are commonly used for joining components, and it is evident that their use is better suited to the application of hand labor. This hand labor, especially in contrast to the economical materials and mass production techniques that are used for forming the component parts of such artificial objects, becomes a high cost factor in the production of artificial objects. In turn, this has caused foreign goods, made in areas where hand labor presents a minimal cost, to flow into this country, undercutting the price of American made goods and perventing these American made products from successfully competing in the U.S. market and in the world market.

With this obstacle in mind, the instant invention is directed towards a product and an affiliated apparatus and process particularly suited to mass production and involving labor only for the loading and maintenance of the necessary machinery. Since the instant invention presents an apparatus which assembles the component parts of an artificial creation, and also makes these components, the need for extensive hand labor is eliminated.

Another failing of the present art is in the very appearance of the juncture mentioned. The easiest way to distinguish an imitation from a natural product is to look at the area where one component joins another. Usually it is evident that some mechanical structure is present to hold the parts together, in contrast to the look of a natural plant wherein one component naturally is supported by another without a mechanistic appearance and usually has grown out from within it. The instant product's junctures, the areas where needles join a stem, look very lifelike, no mechanical joints being seen, since one end of the needle is embedded within the stem. Thus the overall product, including its juncture areas, closely imitates a product of nature. In addition, since no tab, button, tape or the like is used, no unnecessary space is required for this juncture and a great number of needles can be inserted rather closely together, giving the full "bushy" look of evergreen branches.

This and various other objects and advantages of our invention will become apparent to the reader in the following description.

Our invention accordingly consists in the features of construction, combinations of elements, and arrangements of parts which will be exemplified in the branch, hereinafter described and of which the scope of application will be indicated in the appended claim.

In the accompanying drawings in which is shown one of the various possible embodiments of our invention, FIG. 1 is an elevational view of an apparatus for manufacturing artificial tree branches of the needled evergreen variety, showing an endless completed branch emerging from the lower end of the apparatus;

FIG. 2 is a close-up perspective view of a segment of our novel artificial tree branch of the needled evergreen variety which is the product of the disclosed apparatus;

FIG. 3 is a fragmentary enlarged top view of the apparatus, with a broken away section to show inner detail, the same being taken along the line 3—3 of FIG. 4;

FIG. 4 is a full central vertical partially schematic cross-sectional view through the apparatus;

FIG. 5 is a fragmentary view similar to FIG. 4 but showing the apparatus 90° later in its cycle;

FIG. 6 is a fragmentary view similar to FIG. 4, but showing the apparatus 180° later in its cycle;

FIG. 7 is a perspective schematic view of the drive programming means for actuating various parts of the apparatus;

FIG. 8 is a transverse cross-sectional view taken along the line 8—8 of FIG. 4; and FIG. 9 is a movement vs. cam shaft angle timing diagram of the cycle of the apparatus.

In general, the invention in its preferred form is accomplished by providing an apparatus, cyclic in operation, which feeds an elongated malleable metal core into a plastic rod extrusion chamber, and then extrudes an endless elongated plastic rod about the core thereby producing an elongated plastic stem capable of being bent to and retaining any desired configuration. This plastic stem is continually fed in an axial direction at near plasticizing temperature while concurrently cold preformed plastic filaments are fed transversely to and radially of the rod from a variety of circumferential directions and axially spaced locations so that the free ends of the filaments contact the rod at many points. The plastics of the rod and filaments are mutually compatible. The filaments are then cut distantly from the stem, these ensuing segments of filaments forming needles radiating from the stem, each needle having one end embedded in the rod. Since the plastic rod, and in particular the portion of the plastic rod embedding each needle, is still in a semi-molten yet solid condition, the proximal ends of the needles will at this elevated temperature become united to the rod by autogenous welding so that the needles are supported by and transported with the rod, as the rod continues its course along a path through the apparatus.

As they near the discharge portion of the apparatus, the needles are oriented to a desired angular position in relation to the length of the rod while a fluid coolant is directed at the junctures of the needles and the rod, solidifying the plastic rod so that thereafter the embedded needle ends are held securely in position.

Referring now in detail to the drawings, the reference numeral 10 denotes an apparatus for manufacturing artificial tree branches of the needled evergreen variety. The several working mechanisms of the apparatus can be seen in an overall view in FIGS. 1 and 4.

The apparatus 10 includes a supply of malleable metal wire in the form, for example, of a rotatably mounted roll 12 of such metal wire 14, e.g. soft steel. The wire is drawn off the roll by wire feeding and guiding rollers 16 and directed in a downward direction as indicated by the arrow A. The wire is used as a core for a flexible plastic rod 18 which forms the stem of the artificial branch 20 of the invention. The core is used to strengthen the flexible plastic rod after the product is completed, and also, as will be shortly seen, conveniently serves as a base about which the rod can be extruded and further transported through the remainder of the apparatus while the rod is in a semi-soft condition, until the plastic material is hardened into a set flexible state. The wire is malleable so that it will be elastic against small pressure, yet can be deformed beyond its elastic limit with moderate hand pressure. This provision is made so that when the artificial branch is used in some ornamental embodiment, the branch can be shaped by bending the rod (thereby bending the internal wire) in accordance with a decorative plan, yet the branch will resist movement caused by accidental contact or the casual touch of an observer. A portion of the wire core, with the plastic rod stripped off, may also be used as a means for joining one end of the branch 20 to another object. It will be realized, however, that, although highly desirable, such a metal core is not a necessity for the present invention and that other materials may be used to strengthen the plastic rod, or the strengthening core may be dispensed with entirely.

The wire 14 after being unrolled from the roll 12 passes into a means 22 for extruding elongated plastic ensheathing rod and feeding the rod at near plasticizing temperature. First, the plastic rod is extruded as a sleeve (jacket) about the wire to form a reinforced plastic rod 18 having a metal core 14. Means for extruding plastic jacketing about a metal core are well known to those skilled in the art, one device for same being shown for completeness of the instant disclosure, but any means for jacketing plastic about a wire core will be satisfactory for the instant apparatus. The extruding means 22 illustrated, known in the trade as a cross-head extruder, consists of a hopper (not shown) through which a synthetic plastic material, polyethylene particles being satisfactory, is fed into a screw barrel 24. A screw 26 rotates in this barrel forcing the plastic material forward. Heat is applied, as by external tubular heaters 28 around the screw barrel, so that as the material is conveyed forwardly, it is melted, and the melt 30 is then forced into a throat 32 within a die head 34.

The soft steel wire 14 is introduced into the rear of the die head and passes through a hollow mandrel 36, this mandrel being concentrically disposed within the conical discharge portion of the throat 32 adjacent the die head 34. Heaters 40 around the die head keep the melt at the proper extruding temperature, and they, as well as the heaters 28 may be electrical resistance or induction units, or jackets through which oil or other heat transfer media may be circulated. The wire meets the plastic melt 30, draws a plastic jacket about itself and finally exits through a forming die 38. The rate of feed of the wire into the die head 34 is matched to the extrusion rate of the plastic from the die head.

The reinforced plastic rod 18 thus emerges with its plastic jacketing at an elevated temperature, e.g. for polyethylene between 380° F. and 440° F., in a semi-soft but solid condition, its required state for the next step in the production of the artificial product. It should be interjected here that although it has been found convenient to produce an extruded rod in the same apparatus as is used for attaching the needles to the plastic rod, the apparatus may be easily modified so that a supply of preformed plastic rod, with or without a core, is initially intruded into the apparatus, and then is heated to the desired semi-soft but solid condition. This may be desirable due to any of several factors as, for instance, factory layout, or the cheaper production of the rod elsewhere, or the utilization of rod requiring highly specialized forming methods.

Polyethelene has been found to be a valuable material from which the plastic rod can be formed, having characteristics of toughness, flexibility, resistance to water and atmosphere, and low cost. This material also allows processing at high rates. Polyethylene operating conditions call for a melt temperature of 390°–400° F., in order to attain good adhesion and drawout qualities of the plastic melt onto the wire. This same material but preferably with a melt point a few, e.g. ten, degrees lower can also be used for the filaments.

The rod with its plastic jacket in a semi-soft but solid condition at near plasticizing temperature is fed longitudinally into a needling unit 42, immediately adjacent the forming die 38, utilized to form plastic needles and imbed them in the plastic rod. The plastic rod is guided so that its longitudinal axis follows a predetermined path 43 of travel through the needling unit 42. The plastic rod feeds through the unit 42 at a constant rate, such rate being coordinated with the programing means which actuates other parts of the apparatus as discussed hereinafter to produce a product having needles emanating therefrom at uniform intervals along the longitudinal axis of the rod.

Plural means are provided to feed the filaments with their free ends along axes transverse to the path 43. This operation begins with a supply including a group of cold preformed plastic flexible filaments 44. The supply consists of coiled spools 46, from which filaments 48 unroll, pass through filament feed rolls 50, through filament guide tubes 52 and then transversely towards the rod 18. There are several such filament supply spools and tubes, the exact number being dependent upon the number of needles to be formed and joined to the rod in each cycle of operation of the apparatus.

In the embodiment shown, twelve supply spools and twelve guide tubes have been utilized, the portions of the tubes near the plastic rod being arranged radially of and equiangularly circumferentially about and axially along the predetermined path 43 within the needling unit followed by the longitudinal axis of the plastic rod 18. The tubes optionally are placed so that they lie in three parallel planes mutually perpendicular to said longitudinal axis, four tubes being disposed quadrantly in each plane. The tubes are not aligned one above another, but rather are rotated 30° between planes so that, proceeding from one tube in the top plane to the next clockwise tube in the middle plane to the next clockwise tube in the bottom plane, a helical path is formed, the twelve tubes thus forming four helical paths about the longitudinal path of the rod 43.

The outfeed ends of the guide tubes 52 are held in transverse radial bores 53 in a large bore open ended tubular cylinder 54, this cylinder being coaxial with the path 43. Although other equipment may be used for leading the cold preformed filaments transversely, radially and circumferentially toward the hot semi-soft but solid rod, the described embodiment has been found highly practical and workable. It is thus seen that the filaments 43 passing through their affiliated guide tubes 52, held within the bores 53 in the cylinder 54, passing then towards the rod 18, will contact the rod in a variety of radial directions spaced circumferentially about and axially along the rod. Since it is desired to have a thick bushy full evergreen branch, a minimum of six and an optimum of twelve filaments per 3/8" of rod (approximately 30 filaments per inch) are utilized to produce a desirable product.

The plastic rod 18 is guided into the needling unit 42 by a chamfered aperture 56 in a small bore open ended tubular cylinder 58. The filaments are axially fed so that their free ends pass from the inner periphery 60 of the cylinder 54 (having previously been severed at that point), through radially oriented longitudinally extending slots 62. These slots are cut radially into a depending central portion 64 of the cylinder 58. There are twelve slots, one to accommodate each of the twelve filament ends passing from the guide tubes 52. The slots are cut longitudinally from at least the plane of the top most guide tubes down through to the bottom of the portion 64, the inner periphery of the slots bounding the lower portion of the path 43 through the needling unit 42. As will be seen, the slots are configured and constructed to allow free transverse passage of the filaments into contact with the rod and free longitudinal passage of the filaments (cut into needles) when in contact with the rod.

The free ends of the filaments are directed by the guide tubes 52 and slots 62 into contact with the plastic rod, embedding themselves within the hot semi-soft but solid plastic jacket, and, due to the temperature of the plastic rod and its large mass as compared with that of the ends of the cold filaments, fusing at least partially with and thereby becoming autogenously welded to the plastic rod. Because of clearances within the needling unit 42 occasionally the free ends of the filaments 48 will not enter the rod 18 radially, but will tangentially slip off to either side of the rod, so that the plastic jacket will embed some portion of the periphery of the filament near the free end and perhaps only a part of the filament and which still forms a plastic weld by fusing the filament end into the rod. This variation enhances the appearance of the product by imitating the asymmetric growth of the natural product.

The filaments are only fed for 90° of the 360° cyclic operation of the needling unit 42. This periodic (intermittent) drive is actuated by a programming means 66, said programming means comprising a constant speed rotary prime mover 68 such as a slow speed motor having an output pinion 69 meshing with a gear 70 fast on a cam shaft 72. Also mounted on the shaft 72 is a quarter segment gear 74 arranged to mesh with a filament drive gear 76 for 90° of every 360° that the cam shaft 72 rotates. The drive gear 76 is mounted on a jack shaft 78 which in turn drives the filament feed rolls 50.

There are two pairs of rolls, each pair being disposed on opposite sides of the needling unit 42. One roll of each pair is driven through an appropriate gearing arrangement (see FIG. 7) by the filament drive gear 76. The other roll of the pair is spring biased toward contact with the driven roll. The filaments pass between these rolls and are thus fed thereby into their affiliated guide tubes 52, each pair of rolls driving six filaments.

It is thus seen that for each 360° rotation of the cam shaft 72, the filaments will be fed for 90° of that rotation, designated the 0°–90° phase for convenience. The length of filament fed in the 0°–90° phase can be adjusted by the size of the rolls 50 and the gear ratios so that in each such 0°–90° phase, the filaments are fed from the inner periphery 60 of the cylinder 54 into the plastic jacket of the rod 18, a satisfactory depth of penetration being about one-sixteenth of an inch. The positions of the filaments subsequent to being embedded in the rod, and immediately before the next step (severance) can be best seen in FIG. 4.

One end of each filament 48 now being joined by fusion welding to the rod 18, severing means are provided to sever the filaments at points distant from the rod into needle segments 80, as by a cutting member 82 and the cylinder 54 which latter serves as a cutting anvil. The cutting member 82 is a large bore thin-walled open ended tubular cylinder with a lower peripheral flange 84, the member being mounted for reciprocal movement coaxial with the path 43. The cutting member has a leading upper circumferential cutting knife edge 86 which is circumjacent to the inner periphery 60 of the cutting anvil 54. When the cutting member 82 with its cutting knife edge 86 moves upwardly (toward the extruder 22), the filaments will be severed between the cutting knife edge 86 and the inner periphery 60 at the terminal orifices of their affiliated guide tubes 52 held in the cutting anvil 54.

Rods 88 depend from the anvil cylinder 54 and pass through apertures 90 in the lower peripheral flange 84 of the cutting cylinder 82. A return compression spring 92 is wound about each rod 88 so that when the cutting member 82 moves upwardly into the cylinder 54, the springs will urge the cutting member towards its previous position downward from and substantially out from within the cylinder 54.

The flange 84 has a horizontally outwardly extending follower 94 which rides on a cutting cam 96. This cam is eccentrically mounted on the cam shaft 72 and is so configured that in each 360° rotation of the gear 70, the follower 94 (and hence the cutting member 82) will be raised and lowered once. The lifting action with which we are now concerned preferably takes place during the 90°–180° phase of the unit's cyclic operation and is the cutting (severing) stroke of the operation. During this phase the springs 92 are compressed. After the cutting member has experienced this upward movement, severing the filaments 48, the apparatus will be in a position as shown in FIG. 5.

The cutting member 82 is also internally serrated below the cutting edge 86 by downwardly flaring internal circumferential shallow steps 98 of buttress cross-section. When the cutting member 82 experiences upward movement, the needles 80, having one end fixed in the semi-soft plastic rod, can partially rotate about this end, and further being flexible along their length due to their plastic material body and large length-to-diameter ratio, can readily slip or slide their free ends, after each filament is severed, over these steps. However, the steps prevent the needles from falling (rotating) as they otherwise might because of the weak joint which then is present between the needles and the rod.

The next step in the process of manufacture is the downward movement of the cutting member 82 urged by the expansion force of the return springs 92 which were previously compressed. This movement is permitted by further rotation of the cam 96. The movement of the cutting member is retrograde and towards the idle position which it held prior to the 90°–180° phase. This downward movement of the member and its internal steps 98 carries the free ends of the needle 80 downwardly, the configuration of the steps now tending to prohibit slippage of the free ends over the steps. This serves as a means for transporting the severed ends of the needle segments so that the segments substantially maintain their positions as the rod is guided through the needling unit 42. At the end of the downward movement of the cutting member, the needles will slant somewhat downwardly from the stem, the positions of the needles and cutting member at this time being shown in FIG. 6. This downward movement takes place in the 180°–270° phase of the 360° rotation of gear 70.

Simultaneously actuated with the downward movement of the cutting member 82 is the downward movement of a stripper 100. This stripper is a ring mounted for reciprocal movement within the anvil cylinder 54, having an inner diameter larger than that of the depending portion 64 and an outer diameter slightly less than the inner diameter of the cylinder 54. The downward movement of the cutting member 82 with its internal steps 98 in contact with the needles 80 causes it to transport the free ends of the needles downward with it. The simultaneous downward movement of the stripper 100 will catch any free ends of the needles 80 that have slipped by the steps 98 and will push them downwardly.

The downward movement of the stripper is caused by the rotation of a stripper cam 102. This cam engages a stripper actuating rod 104 which is attached to the stripper. The cam 102 is eccentrically mounted on the cam shaft 72 and is so configured that the stripper will experience one downward and upward movement in each 360° rotation of the gear 70, the downward movement taking place during the 180°–270° phase of the cyclic operation. The weight of the stripper and its rod is sufficient to enable the stripper to follow the cam 102. The position of the various parts of the apparatus at this point with the stripper in its downward position can be seen in FIG. 6.

The stripper returns to its uppermost position in the 270°–360° phase. This is the only movement during this period (with exception of the constant longitudinal movement of the plastic rod), completing the 360° cyclic operation with all parts now in their original 0° position and ready to repeat the described movements and functions during subsequent 360° rotations of the gear 70.

Briefly summarizing the movements above described, with particular reference to the timing diagram of FIG. 8, it is seen that during the 0°–90° phase the filaments are fed transversely toward the plastic rod, this being the only phase during which such feed takes place. The stripper is stationary in its up position and the cutting member is stationary in its down position.

At 90°, the free ends of the filaments will have been embedded in the heated semi-soft but solid plastic rod. Then during the 90°–180° phase, the cutting member is driven upwardly severing the filaments and so forming needles from the filaments.

During the 180°–270° phase, the cutting member returns to its down position, its internal steps carrying the severed ends of the needles downwardly with it. Simultaneously, the stripper moves downwardly clearing the internal periphery of the cutting anvil 54 of any needles lost by the steps. The stripper returns to its up position during the last 270°–360° phase completing the cycle. The entire cyclic operation is coordinated with the rate of feed of the plastic rod, so that the needles appear at uniformly equidistant points along the longitudinal axis of the rod. The rod is moved downward approximately ⅜″ during each 360° cycle, this yielding the aforementioned approximately 30 needles per inch. It will be appreciated by the reader now familiar with our invention that the drawings of the apparatus are stretched out to give a clear uncluttered picture of the apparatus.

When the rod 18 with needles radiating from it emerges from the needling unit 42, these needles will not, as a rule, be uniformly oriented nor oriented in the exact manner desired. To uniformly orient all of the needles to a desired angular position with respect to the length of the rod, a means for orienting the needles comprising a stationary horizontal circular ring 106 is utilized. This ring is placed near the exit portion of the needling unit 42, with its center coaxial with the longitudinal axis of the plastilc rod 18. The inner diameter of the ring is approximately the same as the least diameter of the steps 98, so that when the plastic rod 18 passes through the ring, the needles will be rotated about their proximal ends in contact with the rod (the plastic jacket still being at near plasticizing temperature) until they have converged sufficiently to slip through the ring. This will take place in the illustrated example when the needles makes approximately a 60° angle with rod. Obviously any desired angle can be obtained by using a ring of proper diameter.

As the needles arrive at this angular position the plastic rod is quenched (chilled) by a means for discharging a fluid coolant to harden the plastic jacket on the rod and to securely join the embedded ends of the needles in the rod. The cooling means may comprise a circular hollow manifold 108 having plural radially inwardly directed discharge nozzles 110 and an inflow duct 112. The center of the circular manifold is coaxial with the longitudinal axis of the rod and has an inner diameter large enough to allow free passage of the rod and its now positionally set needles. A coolant is pumped into the inflow duct 112 through the manifold 108 and out of the discharge nozzles 110 as an atomized spray, the latter being so pointed and disposed that the coolant from them contacts the intersections of the needles and the rod as the tips of such needles brush by the ring 106. Water is a preferred coolant but air and other known coolants may be utilized.

The exiting product is cut off in suitable lengths, as with a pair of shears.

It will be seen then that the product, best seen in FIG. 2, which leaves the apparatus described is an artificial tree branch of the needled evergreen variety. The branch has a central elongated flexible thermoplastic stem, essentially of uniform cross-section, which is a segment of a rod 18 of a synthetic plastic material. Numerous thermoplastic flexible needles 80 radiate from the rod in many angular directions from points spaced equiangularly circumferentially about and axially equidistantly along the rod. Each needle is of a smaller dimension than the rod and has an end unitarily joined to the stem.

Each needle intersects the stem at approximately the same angle. This angle may be less than 90°, and 60° has been found desirable. Each needle describes a conical path when the stem is rotated, the array or totality of needles then describing a set of commonly oriented tightly stacked cones.

Each needle extends into the plastic jacket to a depth, for instance, of approximately one-sixteenth of an inch, and this proximal end is autogenously welded to the jacket. The plastic rod has a small annular swell circumferentially about the welded needle end, at the point where the end penetrates the rod. This swell is caused by the needle displacing (upsetting) some plastic material when it entered the jacket. Since the jacket at the time of entry is in a semi-soft yet solid state, the plastic will not flow sufficiently to eliminate this swell and assume a perfectly circular cross-section. These swells enhance the imitative qualities of the product, it appearing that the needle has grown out of a small bud or protuberance in the rod.

The stem plastic may be brown and the needle plastic green, similar to the coloring of a natural evergreen branch.

The branch has been made by an apparatus geared for mass production precluding any need for hand labor in assembling the branch. Since each needle is integrally joined to the stem, no external mechanistic juncture is present to detract from the imitative qualities of the instant product.

It thus will be seen that we have provided a branch, which achieves the several objects of our invention and which is well adapted to meet the conditions of practical use.

As various possible embodiments might be made of the above invention, and as various changes might be made in the embodiment set forth, it is to be understood that all matter herein described or shown in the accompanying drawings is to be interpreted as illustrative and not in a limiting sense.

Having thus described our invention, we claim as new and desire to secure by Letters Patent:

An artificial tree branch of the needled evergreen variety including a central elongated stem of uniform cross-section comprising a preformed segment of a rod fabricated from a synthetic organic thermoplastic flexible resin and numerous self-supporting yet flexible needles radiating in many angular directions from several points spaced circumferentially about and axially along the stem, each said needle constituting a segment shorter than the rod and of a preformed filament fabricated from a synthetic organic thermoplastic resin compatible and miscible when fused with the resin of the stem, said needle having a diameter substantially less than that of the rod and being straight from end to end, the proximal end of each needle extending straight into and being embedded within the stem under the external surface thereof, said proximal end and the immediately surrounding region of the stem being permanently joined by a thermally-induced local melt between the resins of said needle end and said local stem region.

References Cited

UNITED STATES PATENTS

| | | | |
|---|---|---|---|
| 1,589,848 | 6/1926 | Harrison | 161—27 |
| 2,610,937 | 9/1952 | Frink et al. | 156—244 |
| 2,837,855 | 6/1958 | Hoke | 161—26 X |
| 2,893,149 | 7/1959 | Reece et al. | 41—15 |
| 3,008,862 | 11/1961 | Haine et al. | 156—244 |
| 3,038,523 | 6/1962 | Merck et al. | 156—393 |
| 3,044,201 | 7/1962 | Lalick | 41—15 |
| 3,085,617 | 4/1963 | Sorg | 156—500 |
| 3,142,611 | 7/1964 | Mills | 161—150 X |

FOREIGN PATENTS 580,003    7/1958    Italy.

ALEXANDER WYMAN, *Primary Examiner.*

JACOB STEINBERG, *Examiner.*

W. A. POWELL, *Assistant Examiner.*